United States Patent
Rachman et al.

(10) Patent No.: US 9,124,653 B2
(45) Date of Patent: Sep. 1, 2015

(54) METHOD AND APPARATUS FOR ALLOWING SHARING OF STREAMABLE APPLICATIONS

(75) Inventors: Ophir Rachman, Sunnyvale, CA (US); Gabriel Malka, Redwood City, CA (US); Uri Raz, Palo Alto, CA (US)

(73) Assignee: Symantec Corporation, Cupertino, CA (US)

( * ) Notice: Subject to any disclaimer, the term of this patent is extended or adjusted under 35 U.S.C. 154(b) by 2889 days.

(21) Appl. No.: 10/934,873

(22) Filed: Sep. 3, 2004

(65) Prior Publication Data

US 2006/0053228 A1 Mar. 9, 2006

(51) Int. Cl.
G06F 15/16 (2006.01)
H04L 29/08 (2006.01)

(52) U.S. Cl.
CPC ..................... H04L 67/34 (2013.01)

(58) Field of Classification Search
None
See application file for complete search history.

(56) References Cited

U.S. PATENT DOCUMENTS

| | | | |
|---|---|---|---|
| 6,237,143 B1 * | 5/2001 | Fontana et al. ............... | 717/127 |
| 6,311,221 B1 | 10/2001 | Raz et al. | |
| 6,374,402 B1 | 4/2002 | Schmeidler et al. | |
| 6,449,688 B1 * | 9/2002 | Peters et al. .................. | 711/112 |
| 6,453,334 B1 | 9/2002 | Vinson et al. | |
| 6,574,618 B2 * | 6/2003 | Eylon et al. ........................... | 1/1 |
| 6,615,312 B1 * | 9/2003 | Hamlin et al. ................ | 711/112 |
| 6,665,772 B1 * | 12/2003 | Hamlin .......................... | 711/112 |
| 6,763,370 B1 | 7/2004 | Schmeidler et al. | |
| 6,868,419 B1 * | 3/2005 | Melick et al. .................. | 709/231 |
| 6,959,320 B2 * | 10/2005 | Shah et al. ..................... | 709/203 |
| 7,039,804 B2 * | 5/2006 | Fichtner et al. ............... | 713/169 |
| 7,167,982 B2 * | 1/2007 | Elliott et al. .................. | 713/164 |
| 7,571,231 B2 * | 8/2009 | Blaukopf et al. ............. | 709/227 |
| 2002/0002657 A1 * | 1/2002 | Sturges et al. ................ | 711/129 |
| 2002/0009538 A1 | 1/2002 | Arai | |
| 2002/0083183 A1 | 6/2002 | Pujare et al. | |
| 2002/0087717 A1 * | 7/2002 | Artzi et al. .................... | 709/236 |
| 2002/0087883 A1 | 7/2002 | Wohlgemuth et al. | |
| 2002/0091763 A1 | 7/2002 | Shah et al. | |
| 2002/0157089 A1 | 10/2002 | Patel et al. | |
| 2002/0161908 A1 | 10/2002 | Benitez et al. | |
| 2003/0004882 A1 * | 1/2003 | Holler et al. ..................... | 705/51 |
| 2003/0009538 A1 | 1/2003 | Shah et al. | |
| 2003/0020671 A1 * | 1/2003 | Santoro et al. ................ | 345/1.3 |
| 2003/0056112 A1 | 3/2003 | Vinson et al. | |
| 2003/0078959 A1 * | 4/2003 | Yeung et al. .................. | 709/201 |
| 2003/0140065 A1 * | 7/2003 | Lovvik et al. ................. | 707/200 |
| 2004/0133761 A1 * | 7/2004 | Goodman ..................... | 711/210 |

(Continued)

*Primary Examiner* — Andrew Goldberg
(74) *Attorney, Agent, or Firm* — Meyertons, Hood, Kivlin, Kowert & Goetzel, P.C.

(57) ABSTRACT

A client on a network includes a file system that includes various non-streamable software applications. A streaming support system in the client enables a streamable software application to be located in the file system and executed in a streaming mode without being isolated from the non-streamable software applications in the file system. Non-streamable software applications can invoke the streamable software application, and vice versa. Multiple streamable software applications can be concurrently located throughout the file system and can be executed in the client in the streaming mode without restriction to any particular portion of the main file system. Streamable applications can be located anywhere in the file system that the corresponding non-streamable versions of the applications would be able to be located. The main file system does not need to contain complete copies of the required files for any streamable applications.

28 Claims, 7 Drawing Sheets

(56) References Cited

U.S. PATENT DOCUMENTS

| | | | |
|---|---|---|---|
| 2004/0139174 A1* | 7/2004 | Hoppe et al. ................ 709/219 |
| 2004/0220976 A1* | 11/2004 | Ananthanarayanan et al. ........................ 707/201 |
| 2005/0044233 A1* | 2/2005 | Cai et al. ...................... 709/227 |
| 2005/0108768 A1* | 5/2005 | Deshpande et al. .......... 725/115 |
| 2005/0198238 A1* | 9/2005 | Sim et al. ..................... 709/222 |
| 2005/0251527 A1* | 11/2005 | Phillips et al. ............... 707/101 |
| 2006/0031547 A1* | 2/2006 | Tsui et al. .................... 709/231 |
| 2006/0136460 A1* | 6/2006 | Pudipeddi et al. ........... 707/101 |
| 2007/0130075 A1* | 6/2007 | Song et al. .................... 705/51 |

* cited by examiner

METHOD AND APPARATUS FOR ALLOWING SHARING OF STREAMABLE APPLICATIONS

FIELD OF THE INVENTION

At least one embodiment of the present invention pertains to streaming of software applications, and more particularly, to a method and apparatus for sharing streamable applications.

BACKGROUND

Application streaming is a technique in which a software application is downloaded from a server to a client on a network and executes on the client before the application has been completely downloaded to the client. As an alternative to the conventional ways of installing and executing software, application streaming has numerous benefits, including allowing centralized and streamlined application management and control, lowering application total cost of ownership (TCO), centralized license allocation management and compliance, reducing information technology (IT) operational expenses, improving service levels, and enabling software suppliers to distribute new capabilities for immediate use across an entire network.

U.S. Pat. No. 6,311,221 of Raz et al. ("Raz"), which is incorporated herein by reference, describes various methods of application streaming. As described by Raz, a computer application can be divided into a number of blocks. After a set of initial blocks are delivered to the client, the application begins to execute while additional blocks are streamed to the client in the background.

U.S. Pat. No. 6,574,618 of Eylon et al. ("Eylon"), which is also incorporated herein by reference, describes client-side software that can be used in conjunction with the techniques described in Raz to facilitate application streaming. As described by Eylon, a client system can be provided with streaming support software that establishes a virtual file system ("VFS") on the client, operatively connected to the client's operating system, such that the VFS appears to be a local storage device. The VFS is accessed via a dedicated streaming file system driver (FSD) and is configured as a sparsely populated file system which appears to the operating system to contain the entire set of application files but, in practice, will typically contain only portions of selected files.

In the technique described by Eylon, all streamable files are stored in the VFS, at least partially; the remaining portions of such files are stored on the streaming server. Consequently, all streamable files are isolated from other (non-streamable) files in the client's file system. Other known application streaming techniques all require streamable files to be isolated from non-streamable files, restricting the streamable files to a special package, a VFS, or a predetermined portion of the client's file system at all times. This isolation provides more control over the streaming process at the client. However, it also undesirably prevents streamable applications and non-streamable applications from invoking or cooperating with each other; i.e., the isolation prevents "sharing" between streamable applications and non-streamable applications.

For example, assume a given client includes a non-streamable version of Microsoft Office in its file system and further includes a streamable version of Adobe Acrobat in its VFS. Using current known streaming technology, such as in Eylon, it is impossible in this situation for (non-streamable) Microsoft Office to invoke or otherwise cooperate with (streamable) Adobe Acrobat. For application streaming to become a complete alternative to the conventional way of executing software, it is important for such sharing of streamable applications to be possible.

SUMMARY OF THE INVENTION

The present invention includes a method and apparatus for enabling a client to execute a streamable software application, where the client includes a file system that includes a non-streamable software application. According to one aspect of the invention, the method includes installing, in the client, client streaming software which configures the client so that the streamable software application can be located in the file system and executed in a streaming mode without being isolated from the non-streamable software application.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

A method and apparatus for allowing sharing of streamable applications are described. A client on a network includes a main file system that includes various non-streamable software applications and an operating system. As described in greater detail below, a streaming support system in the client enables sharing of streamable applications. More specifically, the client streaming support system enables streamable software applications to be located in the client's normal file system, with the non-streamable software applications, and executed in a streaming mode. The streamable software applications are not isolated from the non-streamable software applications, and there is no need for a virtual file system or any special file system section or container to contain the streamable software applications. Non-streamable software applications can invoke the streamable software application, and vice versa. Multiple streamable software applications can be concurrently located anywhere in the file system and can be executed in the client in the streaming mode without restriction to any particular portion of the file system. Streamable applications can be located anywhere in the file system that the corresponding non-streamable versions of the applications would be able to be located. The client streaming software further enables the locations of streamable software applications within the file system to be user-modifiable to the same extent that the locations of corresponding non-streamable versions of the applications would be user-modifiable.

In certain embodiments, the client streaming support system is software that includes a streaming file filter driver. The file filter driver intercepts requests to the file system by the operating system for blocks of a streamed application during streaming execution and, in response to the requests, determines whether the blocks belong to a streamable file. If the blocks belong to a streamable file, the file filter driver determines whether the blocks are present in the client. If a requested block is present in the client, the file filter driver provides the block to the operating system. Otherwise, the file filter driver causes the application manager to request the block from a remote streaming server. In response to receiving the block from the remote streaming server, the application manager provides the block to the operating system.

Figure 1:
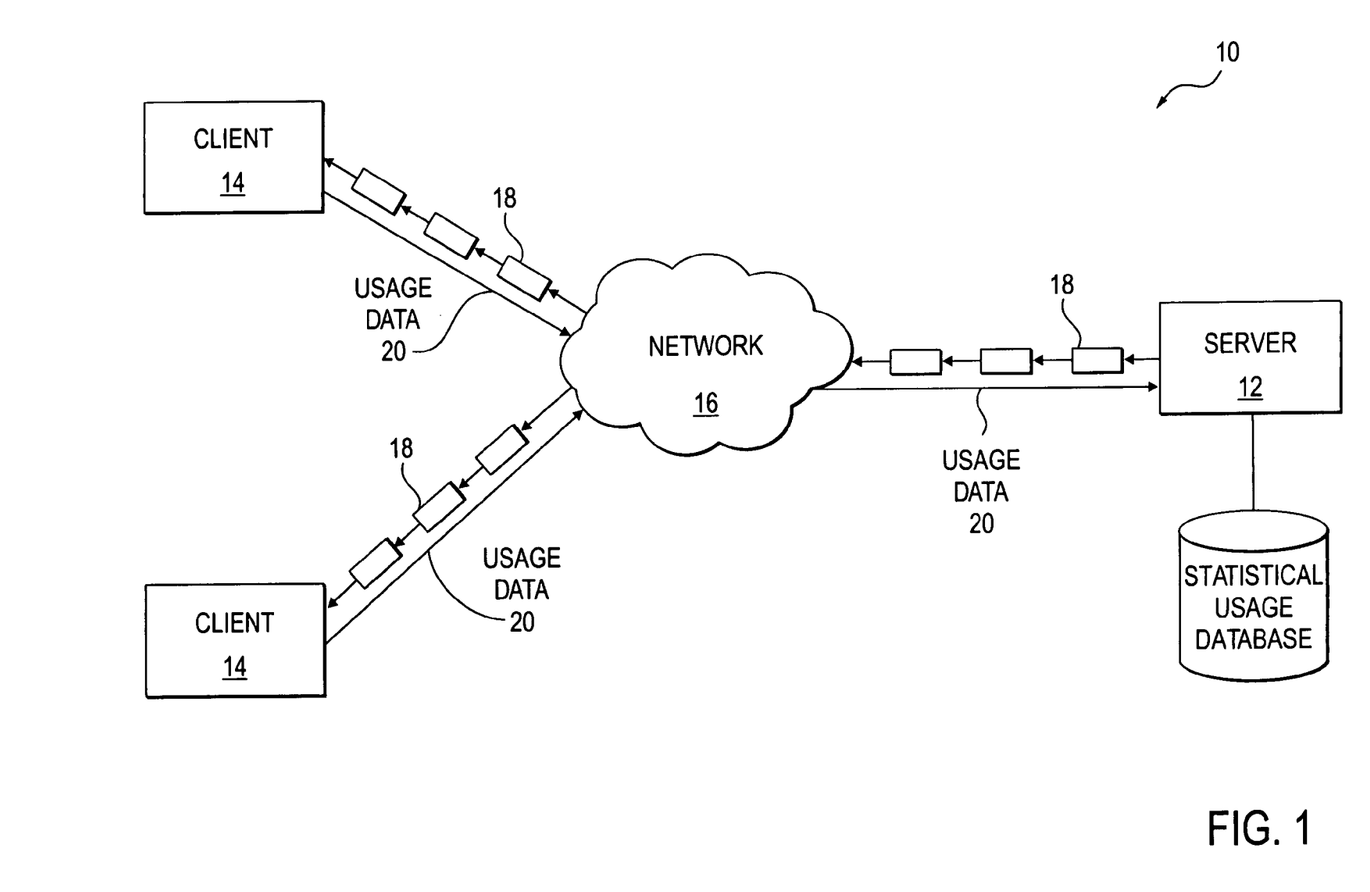
FIG. 1 is a high-level block diagram of a network environment in which the invention is implemented.

FIG. 1 shows a block diagram of an example of a network system 10 in which application streaming is implemented. The system includes a streaming server 12 which is connected to one or more clients 14 via a data network 16, such as the Internet, an intranet, extranet and/or other type(s) of data network(s), including one or more wireless data networks. Before streaming an application, the application files are divided into small segments called "blocks". Each such block can correspond to a data block that would be processed by the operating system expected to be running on the client system. For example, standard Windows systems utilize a 4 Kbyte code page when loading data blocks from disk or in response to paging requests, so streamable application files may be broken up into 4 Kbyte blocks corresponding to the code pages expected used by the client operating system, although that is not necessarily so.

Rather than delivering an entire application prior to execution, the server 12 delivers information about the application files and preferably only a small portion of the application itself. In particular, the client 14 may receive a file structure specification which defines how files associated with the application and required for the application to operate appear to a computer when the application is locally installed. The file structure specification may define the structure of at least the primary application file which is loaded by the operating system when the application is initially executed.

Further, a startup set of blocks is preferably sent to the client which includes at least those blocks containing the portions of the application required to enable execution of the application to be initiated. Preferably, the startup blocks set comprises those blocks required to begin application execution and have the application run to a point where user interaction is required. Most preferably, the file structure specification and the startup block(s) are provided to the client in one package. In addition, further application information, such as registry information, environmental variable settings, additions to system control files, and other system modifications or additions which may be required to "virtually install" the application can be provided.

After the blocks in the startup blocks set are received and loaded, e.g., during a short streaming initialization phase, and provided environmental information is processed, the application is executed. Even though typically only a small fraction of the application's files (or portions thereof) are locally present on the client, enough is generally present to for the application to run to the point that user interaction is required. The remaining application blocks can be delivered to the client automatically by the server or in response to fetch requests issued by the client. The blocks may be delivered to the client in compressed form and decompressed as they are received and stored locally in the client 14. The blocks can be forwarded to the client 14 individually or grouped together and pushed to the client in clusters as appropriate. Usage information 20 can be sent from the client 14 to the server 12 and can be used by the server 12 to determine which blocks to provide next.

The server 12 can be configured to automatically forward sequences of blocks to the client 14 using a predictive streaming engine which selects blocks to forward according to dynamic statistical knowledge base generated by analyzing the various sequences in which the application program attempts to load itself into memory as various program features are accessed. Such a knowledge base can be generated by analyzing the past and present behavior of the current user, the behavior of the entire user group, or the behavior of subsets within that group. As a result, the blocks 18 which are predicted to be needed at a given point during execution can be automatically sent to the client 14 so that they are generally present before the application attempts to access them. Both code and data, including external files used by the application, can be predictively streamed in this manner.

Statistical techniques can be used to analyze the sequence of code and data loads generated by an operating system as it executes an application and determine an optimal order to push the application blocks to the client. In one embodiment, the predictive knowledge base can be viewed as a graph where a node is a user request (e.g. save, load) and an edge is the calculated probability that such a request will be made.

Figure 2:
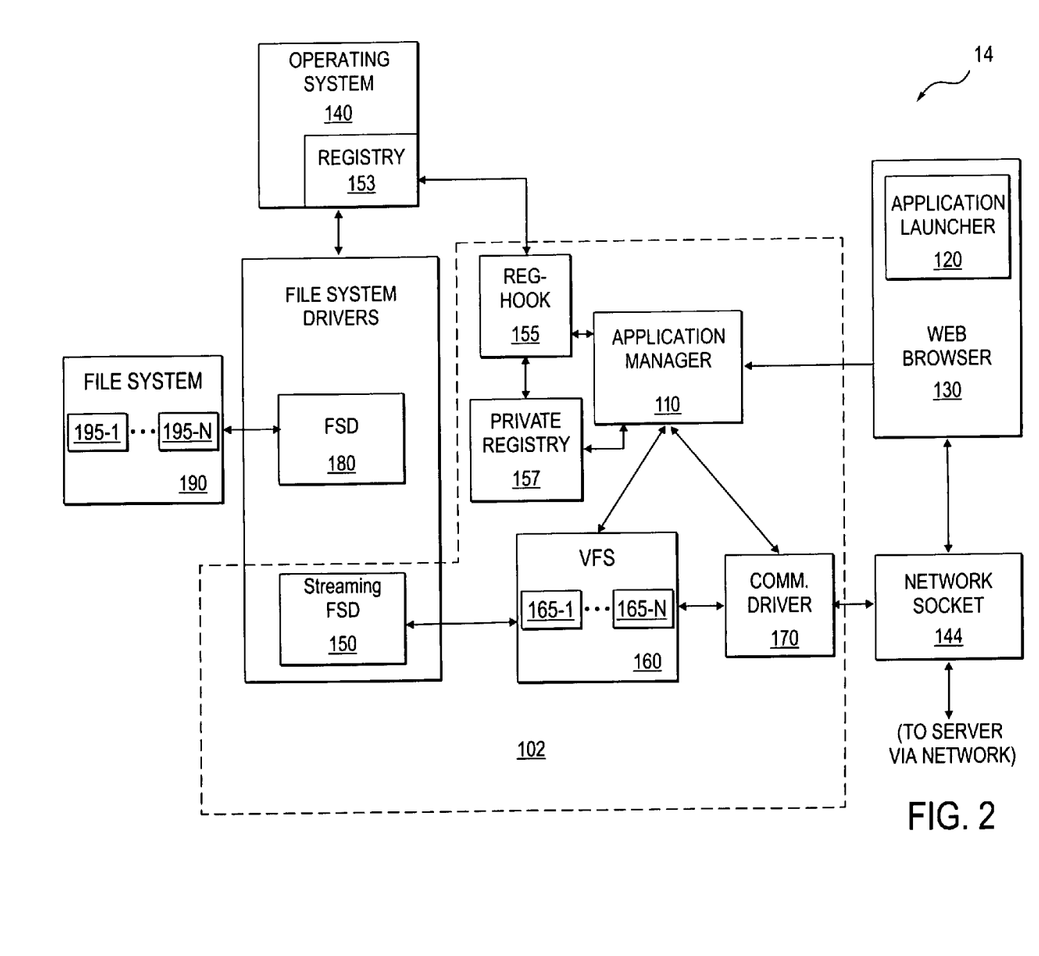
FIG. 2 is a block diagram showing the architecture of a client which does not allow sharing of streamable applications.

Before discussing the sharing technique introduced herein, it is useful to discuss a known implementation which does not permit sharing of streamable applications. FIG. 2 is a block diagram of a client 14 with a streaming support system 102, according to one known implementation which does not permit sharing. Files stored locally in the client 14 may be stored in any one or more conventional data storage devices in the client 14, such as one or more magnetic or optical based disk drives. The client 14 has a main file system 190 to keep track of these files, which is a hierarchical structure for storing the names and locations of files. All non-streamable files 195-1 through 195-N stored in the client 14 are located in the main file system 190. The operating system 140 on the client 14 has access to the main file system 190 through a conventional file system driver (FSD) 180.

The client 14 also includes a virtual file system ("VFS") 160 to store and organize received program blocks and to present an appearance to the operating system 140 that all of the application files are locally present. The VFS 160 can reside on a local storage device, such as the client's hard drive. Alternatively, some or all of the VFS 160 can be retained in main memory. In the illustrated system, all streamable files 165-1 through 165-N must be stored in the VFS 160, where they are functionally isolated from the non-streamable applications 195.

A streaming FSD 150 acts as an interface between the operating system 140 and the VFS 160. The VFS 160, through the FSD 150, is configured to appear to the operating system 140 as a local storage device which can be accessed through the FSD 150 by the operating system 140 in the same manner as other data storage devices 190. When a streamable application is launched, it is configured to indicate the VFS 160 as the source for streamable application files. Thus, from the point of view of the operating system 140, the streamable application appears to be present on a local drive. However, the VFS 160 does not need to (and generally will not) contain complete copies of the various required application files.

Instead, only those portions of the various data files which have been provided to the client 14 as individual blocks are present. The data that represents some files may be missing and other files may be only partially present.

The streaming support system 102 also includes an application manager 110 and a communication driver 170. The application manager 110 is configured to initiate execution of a streamable application after sufficient blocks have been received. In addition, the application manager can "register" the streamable applications with the VFS 160 and/or the streaming FSD 150 to limit access to the streamed data to authorized applications as a way of preventing a user from extracting streamed data from the VFS 160 without authorization. The application manager 110 can be further configured to monitor and meter the usage of the program, to indicate the application status to the end user, and perform or initiate cleanup functions when the application is terminated. The communication driver 170 is configured to process blocks which are pushed to the client from the server and issue requests to the server for blocks needed by the VFS 160.

The client 14 also includes a registry hook component (RegHook) 155. RegHook 155 is an interface between the client operating system's normal registry 153 and a separate, private registry 157, which the application manager 110 creates for streamable applications. In the illustrated client system, the registry data for all streamable applications must be stored in the private registry 157, not in the normal registry 153.

In the illustrated system, all non-streamable applications 195 are stored in the client's main file system 190, while all streamable applications 165 must be stored in the VFS 160, where they are not directly accessible to the operating system 140, and where they are functionally isolated from the non-streamable applications 195. Further, a separate, private registry 157 is used for streamable applications 165. The isolation of streamable applications 165 required in this system architecture provides control over the streaming process at the client 14. However, it also undesirably prevents streamable applications 165 and non-streamable applications 195 from invoking or cooperating with each other.

Figure 3:
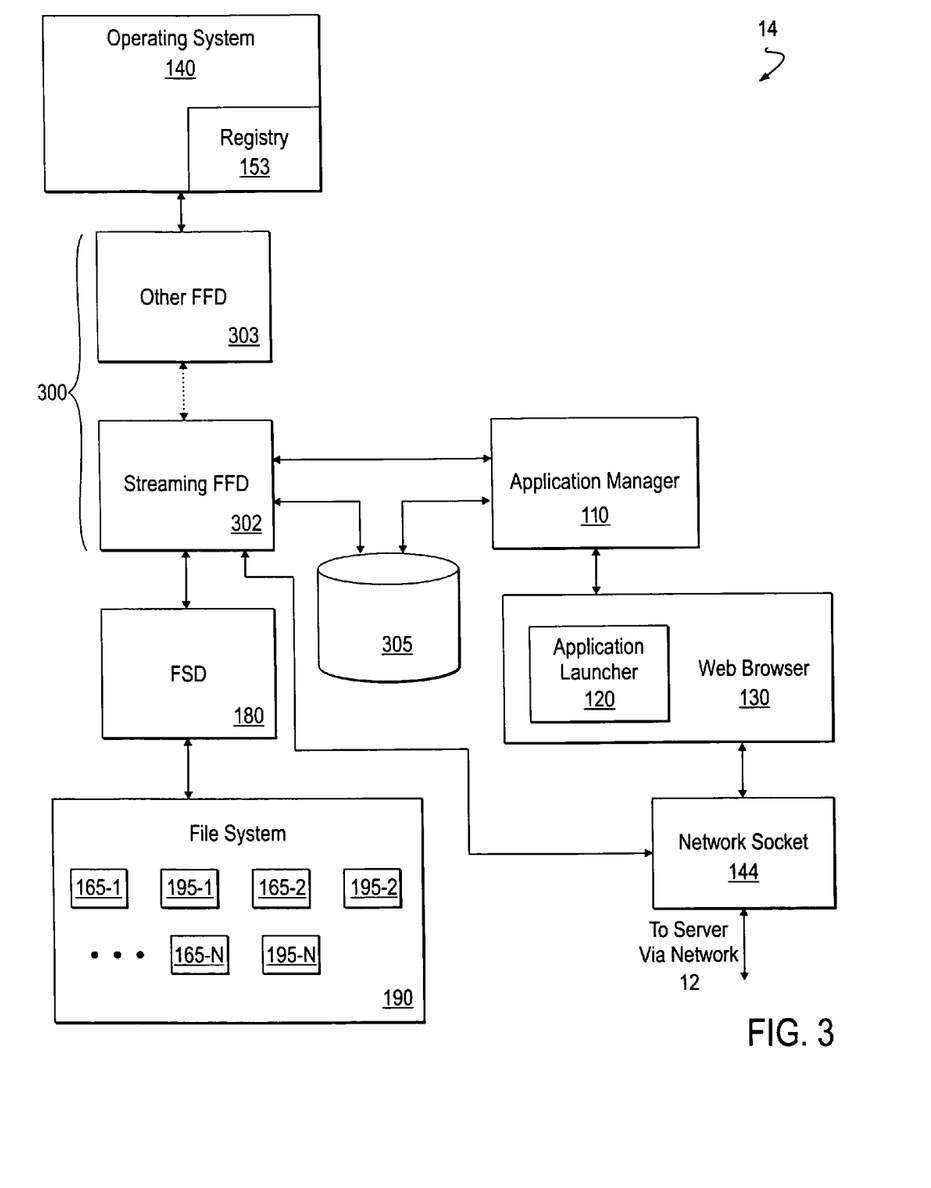
FIG. 3 is a block diagram showing the architecture of a client which allows sharing of streamable applications.

In contrast, FIG. 3 shows a client architecture which enables streamable applications and non-streamable applications to invoke or cooperate with each other, i.e., which permits sharing. All streamable files 165 are maintained in the main file system 190 of the client 14 along with all non-streamable files 195. The adjective "main" in the term "main file system" is used herein to distinguish from a virtual file system or a secondary file system, but does not imply that the client 14 must have more than one file system. That is, the main file system 190 may be the only file system which the client 14 has. Nonetheless, the main file system 190 may still include multiple physical and/or logical storage devices, such as a "C:\" drive, a "D:\" drive, etc. The main file system 190 can contain multiple streamable applications at the same time. In addition, registry data for all applications, including streamable applications, are stored in the normal registry 153 of the client 14; no separate, private registry is required.

This capability is provided, at least in part, by a streaming file filter driver (FFD) 302 in the client 14. Note that the word "streaming" in "streaming FFD 302" indicates that the streaming FFD 302 provides the operating system 140 with access to streamable applications, not that the streaming FFD 302 is itself streamable. The streaming FFD 302 may be one of multiple FFDs 300 which are functionally between the operating system 140 and the main file system 190. For example, other FFDs 303 may be used in the client 14 for other purposes, such as virus scanning. The streaming FFD 302, however, preferably is the lowest layer FFD, at least from a streaming perspective.

The streaming FFD 302 intercepts requests from the operating system 140 for blocks of files and determines whether each requested block belongs to a streamable file, based on data stored in a data structure 305. The data structure 305 includes information such as which files are streamable, identities of the blocks into which each file has been divided, and which blocks have already been downloaded from the server 12 (i.e., are cached in the client 14). More specifically, the data structure 305 can contain a block map (not shown) that can be used to associate every block of every streamable file in the main file system 190 with a respective file name and position within that file. The block map indicates the parts of the various application files with which each block is associated. The block map may also indicate which blocks are not currently present in the client 14.

When the streaming FFD 302 intercepts a request from the operating system 140 for a block, if the requested block does not belong to a streamable file, the streaming FFD simply passes the request to the FSD 180, which locates the request block in the file system 190 and passes the block back to the operating system 140. If a requested block belongs to a streamable file, however, then the streaming FFD 302 first determines whether the block is present in the client 14. If the block is present in the client 14, the streaming FFD 302 then provides the block to the operating system 140. If the block belongs to a streamable file but is not present in the client 14, the streaming FFD 302 causes a request for the block to be sent from the client 14 to the remote streaming server 12. In response to receiving the block from the server 12, the streaming FFD 302 provides the block to the operating system 140.

In certain embodiments, such as illustrated in FIG. 3, the client streaming support software also includes an application manager 110, which is an assisting user mode component that can be used by the streaming FFD 302 to perform certain operations. Such operations may include, for example, interactions with the server and/or initially starting a streamable application, as described further below. Nonetheless, it should be understood that the streaming FFD 302 can be implemented to perform all of the streaming related operations described below, such that the application manager 110 may not be used or even present in every embodiment of the invention. Similarly, the functionality of the application manager 110 and/or the streaming FFD 302 can be combined with other modules, such as the application launcher 120. Note that the specific implementation of the streaming FFD and application manager functionality is dependent on the operating system 140 and the complexity of the streaming environment, among other factors.

Figure 4:
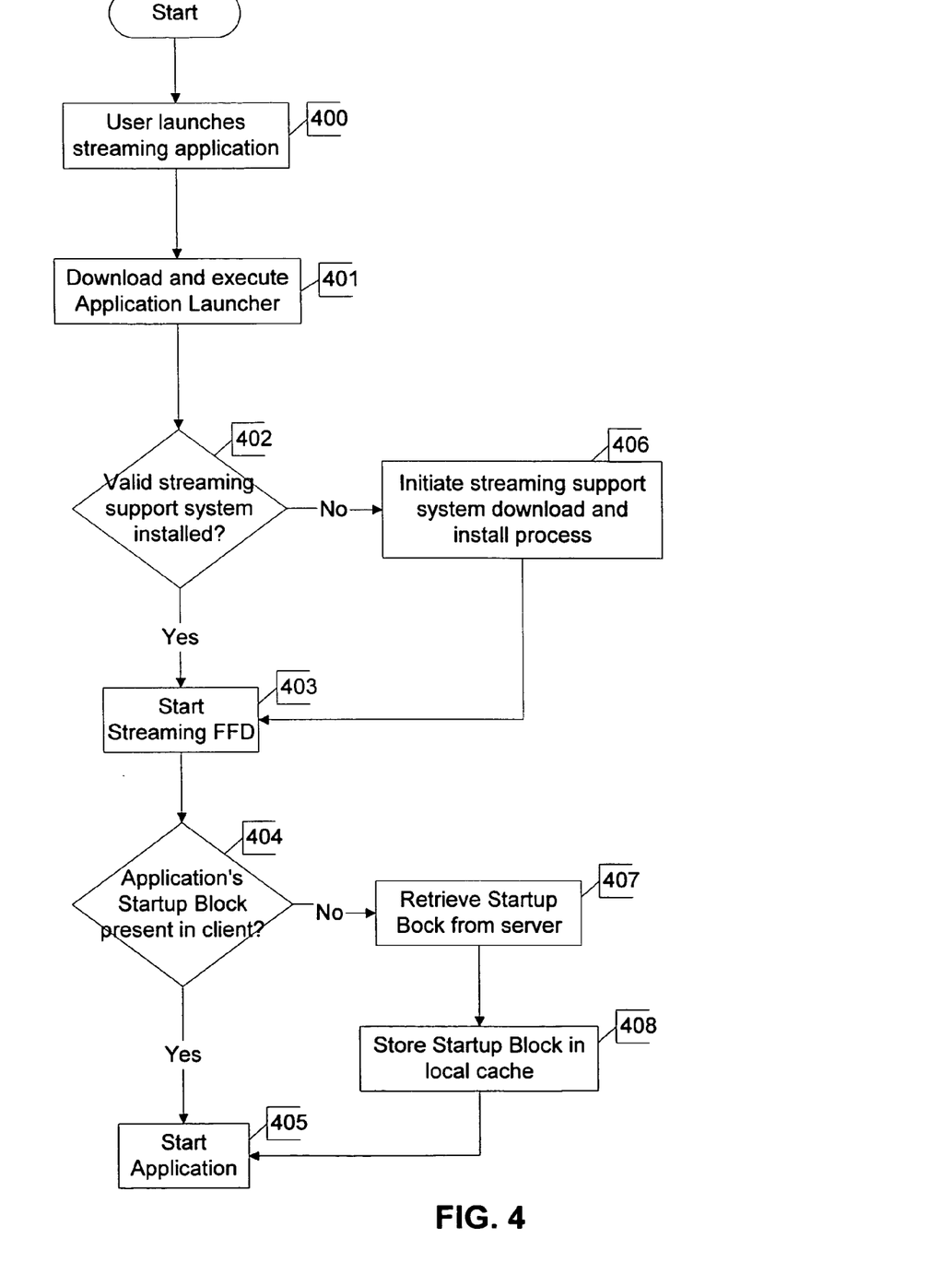
FIG. 4 is a flow diagram illustrating a process used to initiate streaming on the client.

Referring now to FIGS. 3 and 4, when a user wants to execute a streamable application on a client 14 running an operating system 140, such as one of the Microsoft Windows operating systems, the user of the client 14 accesses the server 12 and initiates an application launch procedure. The server 12 can be accessed in various ways. In some embodiments, access to the server 12 is provided through a Web page displayed by a Web browser 130, or through a special application residing on the client 14 and providing access to the server 12. In a web-browser based implementation, an application launcher 120, which can be a small software module such as an applet or an embedded object, is included within or loaded through a streamable application startup web page. The startup web page can be hosted on the server 12, a third party server, or even stored on the client 14. When the link to the desired streamable application is triggered by the user (step 400), the application launcher 120 is downloaded from the server 12, if necessary, and then executed (step 401). The link to the application launcher 120 can be provided as an icon on the client system desktop, an Internet URL link, or any other suitable link or pointer. A log-on routine can also be provided to ensure that the user has authorization to access the particular application at issue and to verify that the user does, in fact, want the application to launch.

On startup, the application launcher 120 checks for the availability of a valid client environment on the client 14 (step 402). In particular, a check is made to ensure that the particular software modules from the streaming support system 102 which are required to manage the streaming of applications are present. If a valid streaming support system 102 is not installed, a client installation process can be executed to download the required streaming support system files from the server and install them on the client 14 (step 406). Once the client environment is verified, the streaming FFD 302 is started (as is the application manager 110, if present) (step 403).

When the streaming FFD 302 is started, it is provided with information that identifies the streamable application to execute and also indicates which blocks of the application are required for initial execution. This information can be passed in whole to the streaming FFD 302 as startup parameters or some can be fetched from the server. More preferably, application information is included in the Startup Block provided to the client 14 by the server 12, to specify details about files, directories, environment settings, etc., that are relevant to the particular application.

When first starting an application, the streaming FFD 302 checks the database 305 to determine whether the Startup Block for the application is already present in the client 14 (step 404), as may be the case if the user has previously executed the streamable application. If the initial Startup Block is present, the streaming FFD 302 instructs the operating system 140 using standard operating system procedures to load and run the application from the main file system 190 (step 405). If the Startup Block is not present, the streaming FFD 302 causes a fetch request to be issued to the server 12 for the Startup Block (by invoking the application manager 110, in some embodiments) (step 407). Once this initial set has been retrieved from the server 12 (step 407) and stored in a local cache in the client 14 (step 408), the application is executed (step 405). In some embodiments, the client 14 notifies the server 12 when a streamable application is started or restarted and indicates in this notification whether the Startup Block is required.

Figure 5:
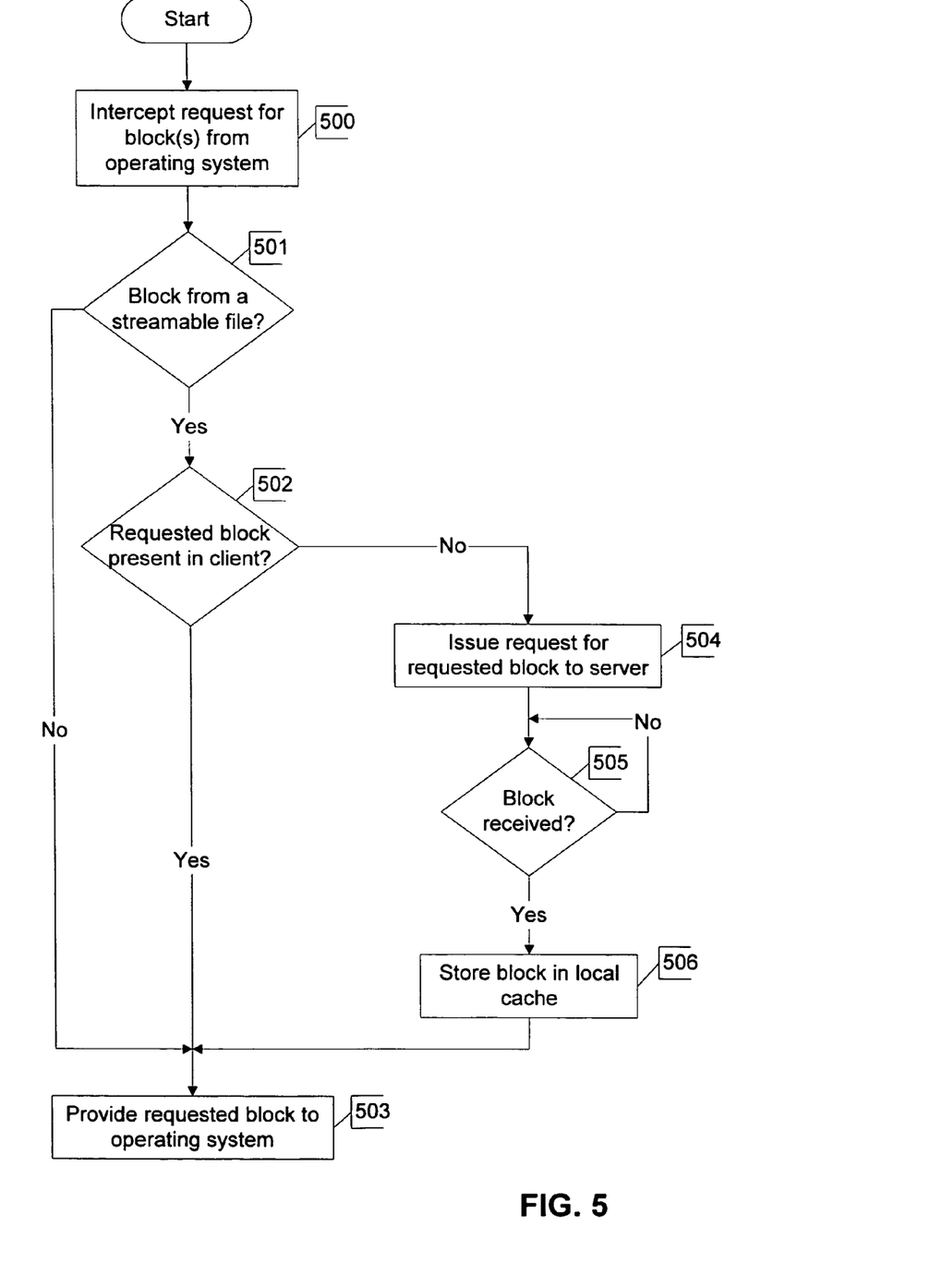
FIG. 5 is a flow diagram illustrating a process performed by the streaming file filter driver (FFD) for providing requested blocks to the operating system.

Referring now to FIG. 5, when a Page Fault exception occurs in the streamable application context, the operating system 140 issues a paging request signaling that a specific page of code is needed for the streamable application. A typical request will specify the drive, file name (or handle), offset, and length of the data block(s) to retrieve. The streaming FFD 302 intercepts this block request (step 500) and determines whether the requested bock belongs to a streamable file (step 501) based on information in the data structure 305. If the block does not belong to a streamable file, then the streaming FFD 302 simply passes the request to the FSD 180, which causes the block to be located in the main file system 190 and returned to the operating system 140 (step 503). If the requested block belongs to a streamable file, then the streaming FFD 302 determines whether the requested block is present in a local cache in the client 14 (step 502). If the block is present in the local cache, it is retrieved and returned to the operating system 140 (step 503). In many cases, as a result of the predictive streaming, blocks requested by the operating system 140 will already reside in the client 14. Thus, even though the entire application is not present on the client 14, the user sees a responsiveness equal or similar to that of a locally running application.

If the desired block is not present in the client 14, a fetch request for the needed block(s) is sent by the streaming FFD 302 to the server 12 (by invoking the application manager 110, in certain embodiments) (step 504). The streaming FFD 302 waits until the request has been fulfilled (step 505). After the requested block has been received from the server 12 (step 505), the streaming FFD 302 stored the block in a local cache in the client 14 (step 506) and provides the block(s) to the operating system 140 (step 503). A busy or wait flag can be presented to the operating system 140 during the time the fetch request is outstanding. As can be appreciated, if there are multiple streamable applications or application threads operating at the same time, the file system 190 may be able to process a subsequent data retrieval request from the operating system 140 even when a prior request is still pending due to an outstanding block fetch request at the server 12.

The format and content of the fetch request issued by the client 14 to the server 12 can vary. In one embodiment, the request specifically identifies the blocks which are required. Alternatively, details regarding the faulting input request issued by the operating system 140, such as the file name, offset, and length, can be forwarded to the server which then determines the appropriate blocks to be returned and may also return additional data not yet requested if it determines that the additional data may be required soon by the client 14. In particular, the server 12 can reset position in a usage data graph to reflect the user's new position in the application's usage space, to ensure that the predictive algorithm will continue to predict the most likely blocks in response to user's actions.

Figure 6:
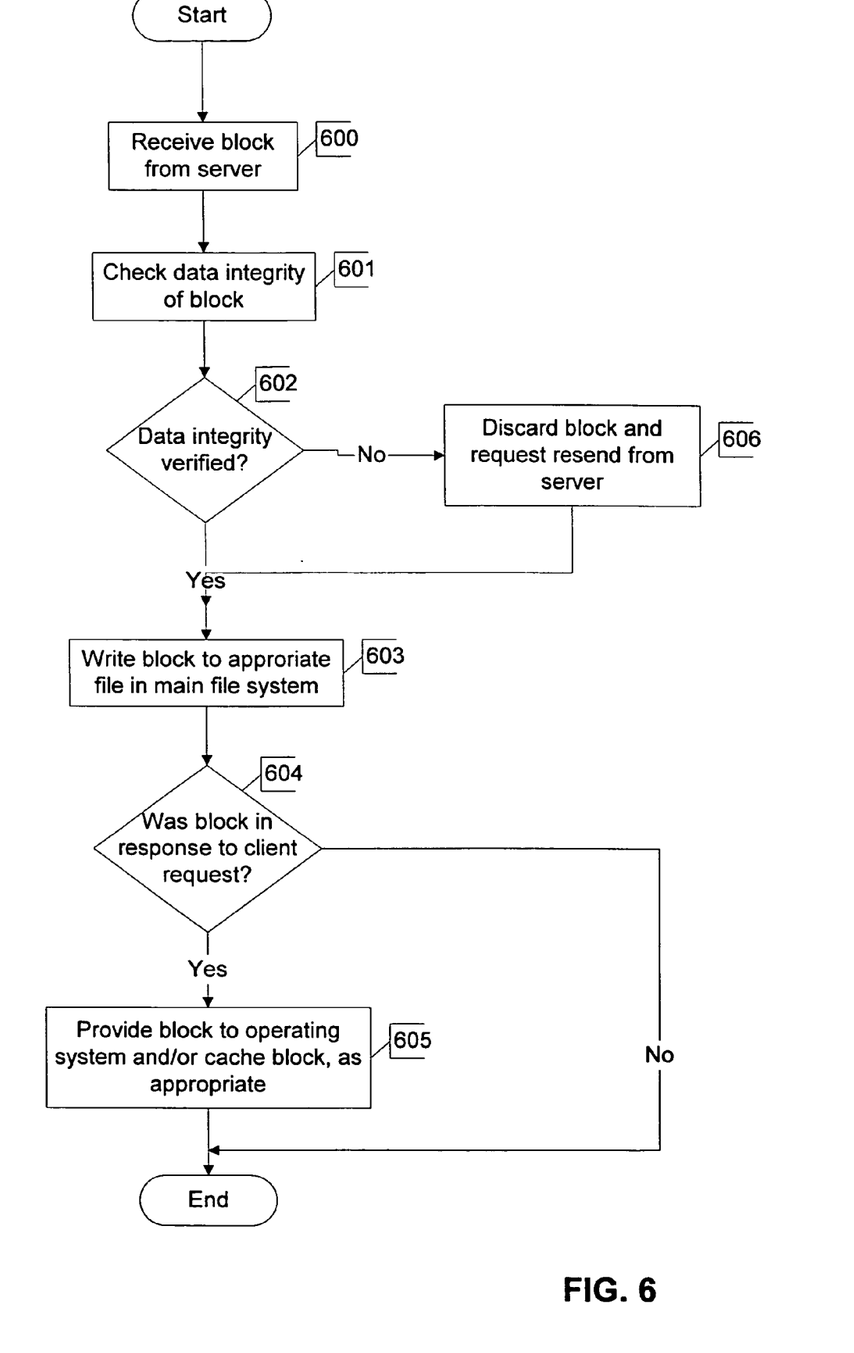
FIG. 6 is a flow diagram illustrating a process performed by the streaming file filter driver (FFD) according to an embodiment of the invention in which blocks may be pushed to the client by the server.

In general, after the server 12 is notified that a streamable application has been started (e.g., by a message forwarded from the client 14 or in response to a request for the startup block set from the client), the streaming process will preferably commence and can remain active throughout the application session. As a result, the client 14 will receive blocks pushed from the server 12. In some embodiments, with reference to FIG. 6, when a block is received at the client 14 from the server 12 (step 600), the block is processed as follows. Initially, the data integrity of the block is verified by the streaming FFD 302 (step 601). If the received block is corrupt (step 602), it is discarded and the streaming FFD 302 issues a resend request to the server 12 (step 606). If the integrity of the data in the block is verified, the received block is written to the appropriate file in the main file system 190 (step 603). If the block was sent in response to a request from the client 14 (e.g., per step 504 in FIG. 5), the streaming FFD 302 then provides the block to the operating system 140 (i.e., if the block was requested by the operating system) and/or caches the block locally, as appropriate (step 605).

Thus, some of the features of the sharing technique introduced above can be summarized as follows. The client streaming support system enables streamable software applications to be located in the main file system of the client, with the non-streamable software applications, and executed in a streaming mode. The streamable software applications are not isolated from the non-streamable software applications, and there is no need for a virtual file system or other special container or file system portion to contain the streamable software applications. Non-streamable software applications can invoke the streamable software application, and vice versa. Further, registry data for all applications, including streamable applications, are stored in the normal registry of the client; no separate, private registry is required. Moreover, multiple streamable software applications can be concurrently located throughout the main file system and can be executed in the client in the streaming mode without restriction to any particular portion of the main file system. Streamable applications can be located anywhere in the file system that the corresponding non-streamable versions of the applications would be able to be located. The client streaming software further enables the locations of streamable software applications within the main file system to be user-modifiable to the same extent as standard, non-streamable versions of the applications. The main file system does not need to contain complete copies of the required files for any streamable applications. Hence, the data that represents some streamable files may be missing from the client and other files may be only partially present for streamable applications, although that fact is not known to the operating system.

Any of various hardware platforms can be used to implement the client and server. For example, the client system can be implemented on a conventional desktop or laptop computer or handheld computing/communication device, running one of the various Microsoft Windows operating systems, for example, such as Windows Millennium, Windows NT, Windows XP or Windows CE. Network access can be provided via standard network applications and web-browsers, such as Microsoft Internet Explorer and Netscape Navigator. The streaming server can be preferably implemented using, for example, a Windows NT or Solaris environment. As will be appreciated, because the server does not execute the streamed program, but simply pushes data blocks and services requests, the server's operating environment does not need to be compatible with the client environment.

Figure 7:
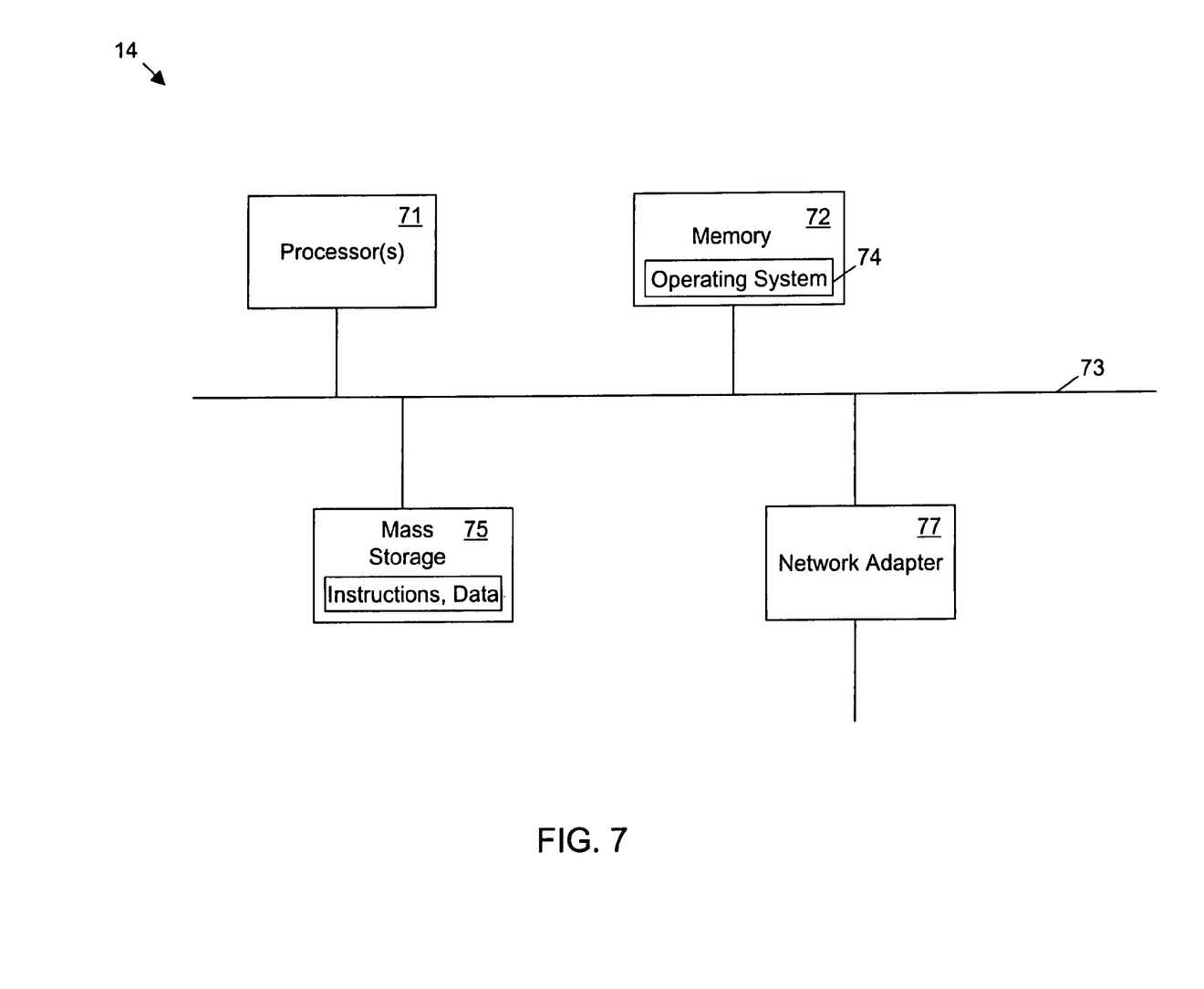
FIG. 7 is a block diagram showing an example of a hardware architecture of a client which can implement the sharing techniques introduced herein.

FIG. 7 is a block diagram showing the architecture of the client 14, according to certain embodiments of the invention. Certain standard and well-known components which are not germane to the present invention may not be shown. The client 14 includes one or more processors 71 and memory 72 coupled to a bus system 73. The bus system 73 shown in FIG. 7 is an abstraction that represents any one or more separate physical buses and/or point-to-point connections, connected by appropriate bridges, adapters and/or controllers. The bus system 73, therefore, may include, for example, a system bus, a Peripheral Component Interconnect (PCI) bus, a Hyper-Transport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor 71 is the central processing units (CPUs) of the client 14 and, thus, controls the overall operation of the client 14. In certain embodiments, the processor 71 accomplishes this by executing software stored in memory 72. The processor 71 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 72 is or includes the main memory of the client 14. Memory 72 represents any form of random access memory (RAM), read-only memory (ROM), flash memory, or the like, or a combination of such devices. During operation of the client 14, memory 72 stores, among other things, the operating system 140 of the client 14 and the client-side streaming support software described above.

Also connected to the processor 71 through the bus system 73 are one or more local mass storage devices 75, which also may store software and/or data to implement the techniques described above, and a network adapter 77. The mass storage devices 75 may be or include any conventional medium for storing large volumes of data in a non-volatile manner, such as one or more magnetic or optical based disks. The network adapter 77 provides the client 14 with the ability to communicate with remote devices, such as the server 12.

Thus, a method and apparatus for allowing sharing of streamable applications have been described. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method, comprising:
   installing, in a client computer system having a file system, a software module that is executable to configure the client computer system to share information between a streamable user application and a non-streamable user application executable on an operating system of the client computer system to request blocks of data for their respective applications and to receive an input from a user;
   wherein the software module is executable to configure the client computer system to share information by:
      locating the non-streamable user application and downloaded portions of the streamable user application in the file system; and
      the operating system maintaining a single registry for the streamable user application and the non-streamable user application, wherein the single registry does not include a portion dedicated to registry data for streamable applications.

2. A method as recited in claim 1, wherein the streamable user application is not located in a portion of the file system reserved for streamable applications but not non-streamable applications.

3. A method as recited in claim 1, wherein the streamable user application is stored at a user-modifiable location in the file system.

4. A method as recited in claim 1, wherein the client computer system is configured to execute the non-streamable user application to invoke the streamable user application, and wherein the client computer system is configured to execute the streamable user application to invoke the non-streamable user application.

5. A method as recited in claim 1, further comprising:
   executing the streamable user application on the client computer system in a streaming mode; and
   receiving one or more blocks of the streamable user application at the client computer system from a remote server while the streamable user application is executing on the client computer system.

6. A method as recited in claim 1, wherein a plurality of streamable user applications are concurrently located in the file system, and wherein each of the plurality of streamable user applications is executable on the client computer system in a streaming mode without being restricted to any particular portion of the file system.

7. A method as recited in claim 1, wherein said software module includes a filter driver that is executable to determine whether a request for a block of data of the streamable user application is for a streamable user application or a non-streamable user application.

8. A method, comprising:
transmitting a software module to a client computer system over a data network, wherein the software module is executable on the client computer system to share information between a streamable user application and a non-streamable user application executable on an operating system of the client computer system to request blocks of data for their respective applications and to receive an input from a user;
wherein the software module is executable to configure the client computer system to share information by:
locating the non-streamable user application and downloaded portions of the streamable user application in a file system of the client computer system; and
the operating system maintaining a single registry for the streamable user application and the non-streamable user application, wherein the single registry does not include a portion dedicated to registry data for streamable applications.

9. A method comprising:
configuring a client computer system having a file system to share information between a streamable user application and a non-streamable user application executable on an operating system of the client computer system to request blocks of data for their respective applications and to receive an input from a user, wherein the configuring includes:
locating the non-streamable user application and downloaded portions of the streamable user application in the file system; and
the operating system maintaining a single registry for the streamable user application and the non-streamable user application, wherein the single registry does not include a portion dedicated to registry data for streamable applications.

10. A method as recited in claim 9, wherein the streamable user application is not stored in a virtual file system for streamable user applications.

11. A method as recited in claim 9, wherein the streamable user application is stored at a user-modifiable location in the file system.

12. A method as recited in claim 9, further comprising:
executing the streamable user application on the client computer system in a streaming mode; and
receiving one or more blocks of the streamable user application at the client computer system from a remote server while the streamable user application is executing on the client computer system.

13. A method as recited in claim 12, wherein a plurality of streamable user applications are concurrently located in the file system, and wherein each of the plurality of streamable user applications is executable on the client computer system in the streaming mode without being restricted to any particular portion of the file system.

14. A method as recited in claim 9, wherein said configuring the client computer system comprises installing a filter driver on the client computer system, wherein the filter driver is executable to determine whether a request for a block of the streamable user application is for a streamable user application or a non-streamable user application.

15. A non-transitory computer-readable storage medium having program instructions stored thereon, wherein the program instructions are executable to perform:
transmitting a software module to a client computer system over a data network, wherein the software module is executable on the client computer system to configure the client system to share information between a streamable user application and a non-streamable user application executable on an operating system of the client computer system to request blocks of data for their respective applications and to receive an input from a user;
wherein the software module is executable to configure the client computer system to share information by:
locating the non-streamable user application and downloaded portions of the streamable user application in a file system of the client computer system; and
the operating system maintaining a single registry for the streamable user application and the non-streamable user application, wherein the single registry does not include a portion dedicated to registry data for streamable applications.

16. A non-transitory computer-readable storage medium having program instructions stored thereon, wherein the program instructions are executable to perform:
configuring a client computer system having a file system to share information between a plurality of streamable user applications and a plurality of non-streamable user applications executable on an operating system of the client computer system to request blocks of data for their respective applications and to receive an input from a user, wherein the configuring includes:
locating the plurality of non-streamable user applications and downloaded portions of the plurality of streamable user applications in the file system; and
maintaining a single registry for the plurality of streamable user applications and the plurality of non-streamable user applications, wherein the single registry does not include a portion dedicated to registry data for streamable applications;
wherein executing at least one of the plurality of streamable user applications on the client computer system, includes receiving one or more portions of the streamable user application from a remote server while the streamable user application is executing on the client computer system.

17. The non-transitory computer-readable storage medium of claim 16, wherein each streamable user application is stored at a user-modifiable location in the file system.

18. A method, comprising:
a filter driver receiving a first request for a first block of data, wherein the first request is received from an operating system of a computer system;
the filter driver determining that the first block is for a non-streamable user application;
the filter driver providing the first request to a file system of the computer system;
the filter driver receiving a second request for a second block of data, wherein the second request is received from the operating system;
the filter driver determining that the second block is for a streamable user application;
the filter driver determining whether the second block is present in the file system;
in response to determining the second block is for the streamable user application and is not present in the file system, the filter driver requesting the second block from a remote server coupled to the computer system via a network; and
wherein the computer system is configured to share information between the streamable user application and the non-streamable user application executable on the operating system and to receive an input from a user, wherein the computer system is configured to share the information by:
- storing both the non-streamable user application and downloaded portions of the streamable user application in the file system; and
- storing registry information for the streamable user application and the non-streamable user application in a single registry maintained by the operating system, wherein the single registry does not include a portion dedicated to registry data for streamable applications.

19. A method as recited in claim 18, wherein the streamable user application is not restricted to any particular portion of the file system.

20. A processing system, comprising:
- a processor;
- a network adapter configured to communicate over a network;
- a memory storing program instructions executable to implement an operating system;
- the memory further storing program instructions executable to share information between one or more streamable user applications and one or more non-streamable user applications executable on the operating system and to receive an input from a user, wherein the program instructions executable to share information are executable to:
  - locate the one or more non-streamable user applications and downloaded portions of the one or more streamable user applications in a file system of the processing system; and
  - cause the operating system to maintain a single registry for the one or more streamable user applications and the non-streamable user applications, wherein the single registry does not include a portion dedicated to registry data for streamable applications; and
- the memory further storing program instructions to implement a filter driver that is executable to determine whether a request from the operating system for a block of data is for a streamable user application or a non-streamable user application.

21. A processing system as recited in claim 20, wherein the memory further stores program instructions executable to request the block from a remote server in response to determining that the block is for a streamable user application and is not present in the file system, and in response to receiving the block from the remote server, to provide the block to the operating system.

22. A processing system as recited in claim 20, wherein the one or more streamable user applications are not restricted to any particular portion of the file system.

23. A processing system as recited in claim 20, wherein the request is from a streamable user application that is stored at a user-modifiable location in the file system.

24. A method, comprising:
- a client computer system locating a non-streamable user application and downloaded portions of a streamable user application in a file system of the client computer system, wherein the streamable user application and the non-streamable user application are executable on an operating system of the client computer system to request blocks of data for their respective applications and to receive an input from a user; and
- the operating system maintaining a single registry for the streamable user application and the non-streamable user application, wherein the single registry does not include a portion dedicated to registry data for streamable applications;
- wherein the locating and the maintaining configure the client computer system to share information between the streamable user application and the non-streamable user application.

25. The method as recited in claim 24, wherein the streamable user application is stored at a user-modifiable location in the file system.

26. The method as recited in claim 24, wherein the client computer system is configured to execute the non-streamable user application to invoke the streamable user application, and wherein the client computer system is configured to execute the streamable user application to invoke the non-streamable user application.

27. A non-transitory computer-readable storage medium having program instructions stored thereon that are executable by a computer system having a file system to:
- configure the computer system to share information between a streamable user application and a non-streamable user application executable on an operating system of the computer system to request blocks of data for their respective applications and to receive an input from a user;
- wherein configuring the computer system to share information includes:
  - locating the non-streamable user application and portions of the streamable user application in the file system; and
  - the operating system maintaining a single registry for the streamable user application and the non-streamable user application, wherein the single registry does not include a portion dedicated to registry data for streamable applications.

28. The non-transitory computer-readable storage medium of claim 27, wherein the program instructions are further executable to implement a filter driver that is executable to determine whether a request for a block of the streamable user application is for a streamable user application or a non-streamable user application.

* * * * *